United States Patent

Von Benda et al.

[11] Patent Number: 5,563,006
[45] Date of Patent: Oct. 8, 1996

[54] ELECTROCHEMICAL CELL

[76] Inventors: Klaus Von Benda, Ulrich von Ensingen Str. 3, 72622 Nürtingen; Gerhard Berger, Natternweg 3, 73061 Ebersbach, both of Germany

[21] Appl. No.: 375,915
[22] Filed: Jan. 20, 1995

[30] Foreign Application Priority Data

Feb. 2, 1994 [ZA] South Africa .......................... 94/0712

[51] Int. Cl.$^6$ .................. H01M 10/38; H01M 10/39; H01M 04/62
[52] U.S. Cl. ................ 429/104; 429/101; 429/102; 429/162
[58] Field of Search .................. 429/101, 104, 429/102, 103, 162

[56] References Cited

U.S. PATENT DOCUMENTS

| H858 | 12/1990 | Leonard et al. | 429/104 |
|---|---|---|---|
| 3,841,914 | 10/1974 | Boyle et al. | 429/162 |
| 4,226,923 | 10/1980 | Mikkor | 429/104 |
| 4,230,778 | 10/1980 | von Benda et al. | 429/104 |
| 4,310,607 | 1/1982 | Shay | 429/104 |
| 4,348,467 | 9/1982 | Wright | 429/104 |
| 4,492,742 | 1/1985 | Haberfellner et al. | 429/104 |
| 4,722,875 | 2/1988 | Wright | 429/103 |
| 4,910,105 | 3/1990 | Tilley et al. | 429/104 |
| 5,230,968 | 7/1993 | Bones et al. | 429/191 |

FOREIGN PATENT DOCUMENTS

| 94/0712 | 2/1994 | South Africa . |
|---|---|---|
| 1586659 | 3/1981 | United Kingdom . |
| 2240424 | 11/1990 | United Kingdom . |
| 2242306 | 3/1991 | United Kingdom . |

OTHER PUBLICATIONS

Article by M. Mikkor, (1980) "Volume Optimization of Sodium–Sulfur Batteries Using Various Advanced Cell Concepts", *Proceedings*, 15th EICEC Conference, vol. I, 561, Aug. 18–22, 1980, Seattle, Washington.

*Primary Examiner*—Prince Willis, Jr.
*Assistant Examiner*—Carol Chaney

[57] ABSTRACT

An electrochemical cell comprises a cell casing defining a negative electrode compartment for containing an alkali metal negative electrode; and a plurality of flat plate solid electrolyte electrode holders in the casing and extending parallel to opposed walls of the casing. Each electrode holder comprises a pair of spaced plates and provides a positive electrode compartment containing a liquid electrolyte, and a positive electrode. The positive electrodes are electrically connected in parallel and define, together with envelopes, a positive plate stack. When the cell is fully charged, the major portion of the liquid alkali metal is contained in the negative electrode compartment outside the positive plate stack. Wicking means for the liquid alkali metal are provided adjacent at least the plates of the holders. The level of the liquid alkali metal remains substantially constant in the wicking means.

17 Claims, 2 Drawing Sheets

ELECTROCHEMICAL CELL

This Invention relates to an electrochemical cell. More particularly, the invention relates to an elevated temperature rechargeable electrochemical cell comprising both a solid electrolyte and a liquid electrolyte, and a molten alkali metal anode.

According to the invention, there is provided an elevated temperature rechargeable electrochemical cell comprising a hollow prismatic cell casing defining a negative electrode compartment for containing an alkali metal negative electrode; a plurality of flat plate solid electrolyte electrode holders or envelopes in the cell casing and extending parallel to an opposed pair of walls of the cell casing, each electrode holder or envelope thus comprising a pair of spaced plates providing major faces of the holder or envelope, with each holder or envelope also providing a positive electrode compartment for containing a liquid electrolyte; a positive electrode in each of the positive electrode compartments, the positive electrodes being electrically connected in parallel and defining, together with their respective envelopes, a positive plate stack, such that in the fully charged state of the cell the major portion of the liquid alkali metal is contained in the negative electrode compartment outside the positive plate stack; and wicking means for the liquid alkali metal, adjacent at least the major faces of the holders or envelopes so that outer plate wicking means adjacent the outermost plates of the positive plate stack and interplate wicking means between adjacent plates of adjacent holders or envelopes in the positive plate stack are provided, and in which the level of the liquid alkali metal remains substantially constant.

By 'outside the positive plate stack' is meant beyond the parallelepiped defined by the outline or periphery of the plate stack.

The alkali metal may be sodium so that the cell has a liquid sodium negative electrode at its operating temperature. The solid electrolyte will then be sodium conducting, and may be selected from the beta-alumina structural family of compounds such as β- or β"-sodium polyaluminate. The liquid electrolyte may then be a liquid molten salt sodium ion conductive electrolyte in hydraulic and ionic contact with both the solid electrolyte and the positive electrode.

The liquid electrolyte may, in particular, be a chloro-aluminate liquid electrolyte melt whose composition is selected to achieve both a low melting point and a high conductivity. Instead, the liquid electrolyte may be a low melting chloro-aluminate composition containing quaternary ammonium or imidazolinium compound or sulphur dioxide as constituents, with these compositions typically being liquid at ambient temperature or below. Still further, the liquid electrolyte may be a molten polysulphide, with the cell then being a so-called sodium/sulphur cell.

The positive active mass may comprise sulphur, a sulphide and/or a polysulphide, phosphorus, a phosphide and/or a polyphosphide, a halide or a polyhalide. Additionally, the positive electrode may comprise metal, non-metal or organic compounds such as, for example, redox active polymeric compounds containing disulphide bridges.

Precursors to the positive electrodes in question may initially be loaded into the envelopes, during assembly of the cell. The precursors will thus have a chemical composition which reacts chemically or electrochemically after cell assembly and during a first charging cycle thereof, to form the positive active masses, which are then periodically discharged and charged during cycling of the cell.

The cell includes a positive current collector with which the positive electrode or its precursor in each envelope is in contact. The cell also includes a positive cell terminal with which all the positive current collectors are in contact. The positive current collectors may comprise graphite or metal felts or foams, expanded metal screens or metal powders. Each positive current collector may extend three-dimensionally throughout its envelope, serving to hold and cage both the solid and liquid constituents of the positive electrode, including the liquid electrolyte.

The wicking means thus serve to feed liquid alkali metal to and from the alkali ion permeable surfaces of the solid electrolyte, irrespective of the state of charge or discharge of the cell, and during which charge or discharge the amount of alkali metal in the cell casing will vary, diminishing with discharge and increasing with charge of the cell, but whose level in the wicking means remains substantially constant. In other words, the level of liquid alkali metal in the non-wicking zones of the negative electrode compartment will vary with the state of charge.

The wicking means must thus be alkali-metal wettable, and must be in contact with a current collector for all states of charge of the cell. The cell includes a negative cell terminal, with the current collector(s) being in contact with or connected to the negative cell terminal. The cell may include a porous metallic structure at the bottom of the cell casing which supports the positive plate stack. The porous metallic structure provides an alkali metal sump or reservoir, and functions also as a negative current collector. It is in electrical contact with the negative cell terminal. The outer plate and interplate wicking means are then in electrical contact with the porous metallic structure for all states of charge of the cell. Instead, any other suitable alkali metal sump may be provided at the bottom of the cell casing. Still further, a common wick contacting both the outer plate and interplate wicking means and the negative cell terminal can instead, or additionally, be provided.

The porous metallic structure or other sump used may support the positive plate stack in an elastic manner, equalising any variations or tolerances in plate height by spanning the lower plate edges—cell bottom distance. The cell casing bottom may be covered by the sump and metal structure essentially to a full extent, or the area taken up thereby may be restricted to that immediately below said parallelepiped.

The spacing between the envelopes or positive electrodes will be as small as is compatible with the requirements of mass transport of liquid alkali metal and electron transport for the particular cell type and its maximum discharge rate.

Electron transport may be provided for by a current collector, which may be in the form of a metal sheet connected to the cell terminal, while alkali metal transport is effected by the wicking means. Thus, for example, a current collector may be provided in or adjacent each wicking means, with these current collectors being in electrical contact with the porous structure on the bottom of the cell casing.

The wicking means may comprise metallic or metallized structures such as felts, fibre packs, foams, corrugated or otherwise profiled sheets, smooth or unprofiled sheets, powders, or combinations thereof, such as powder sprayed metal sheets.

The wicking means may, however, be selected such that their electrical conductance complements that of the liquid alkali metal contained in the wicking zone, ie in the area contacted by the wicking means, and that of the porous metallic structure.

The wicking means may also be selected such that their electrical conductance is sufficiently high so that they are, in addition to being capable of alkali metal transport, also capable of electron transport. This will obviate the need for the separate current collectors adjacent the plates of the positive plate stack. Thus, the wicking means then function also as current collectors.

Good hydraulic and electric contact must be maintained between the solid electrolyte plates and the wicking means, inclusive of any associated current collectors, for all normal operational temperatures and tolerances of manufacture. Such tolerances may include the degree of flatness of the ceramic electrolyte surfaces, and inter-envelope distances. Wicking means assembled as separate cell components to be inserted between ceramic solid electrolyte envelopes or to be pressed against outer faces of such envelopes are, therefore, advantageously designed to be sufficiently elastic and compliant to fulfill that task, and non-wicking components such as current collectors or support structures and matrices are advantageously designed to be elastic and to press the wicking means and envelopes together. Alternatively or additionally, wick pressing means, such as springs, may be provided.

Thus, at least one of the wicking means can press against the envelope plate against which it abuts, with that wicking means thus being sufficiently elastic and compliant to fit snugly against the plate.

Instead, the wicking means may be fixed to the ceramic separator surfaces. Thus, a porous conductive layer, eg of electrically conductive ceramic, may be applied to the anodic sides of the solid electrolyte surfaces, eg by co-sintering, plasma spraying, or by a suitable cement. Preferably, a cement setting to a conductive, porous layer is used, and the required porosity may be achieved by using pore-formers, by including fibres thereon, and by other measures known in the art. If the conductivity of said cement is sufficiently high, the envelopes can be cemented together by these wicking means, thereby bridging the inter-envelope gap and creating a unitary plate block, thus obviating any wick pressing means.

Thus, at least one of the wicking means can be in the form of a porous conductive layer fixed to the envelope plate against which it abuts. The porous conductive layer can then be located between a pair of envelopes, and cement together adjacent plates of the envelopes, thereby bridging the gap between the envelopes and creating the unitary plate block.

For low electrical resistance, the negative current collectors may contact more than one face of the cell casing, if said cell casing is electrically conductive and serves as a cell terminal.

A support structure may be provided adjacent at least one of the wicking means. The support structure may be porous and deformable, and may be interposed between the cell casing and the positive plate stack. Thus, at least portions of the non-wicking outer zones are provided with support structures. The compressive strength of said structures may be chosen so that they yield to an eventual casing deformation without breaking the ceramic envelopes.

The support structure may comprise a metal or non-metal fibre plates, corrugated sheets with or without perforations, expanded metal type nettings and other suitable structures which do not compete with alkali metal wicking means to a significant extent, ie for which the capillary pressure is significantly less than that of the wicking means against which it abuts.

Edges of the envelopes which extend parallel to the general direction of current flow may be located close to the cell casing, with additional outer wicking means being provided in the space between these edges and the casing. These additional outer wicking means may be inserted as separate cell components, or they may be formed by extending the inner/interplate wicking means and, optionally, one of the outer wicking means to wrap around the edge of the adjacent envelope, with or without overlapping each other.

The invention will now be described by way of example with reference to the accompanying diagrammatic drawings.

BRIEF DESCRIPTION OF THE DRAWINGS

The same or similar components in the drawings, ie in FIGS. 1 to 4, are indicated with the same reference numerals.

Referring to FIG. 1, reference numeral 10 generally indicates an electrochemical cell in accordance with a first embodiment of the invention.

Figure 1:
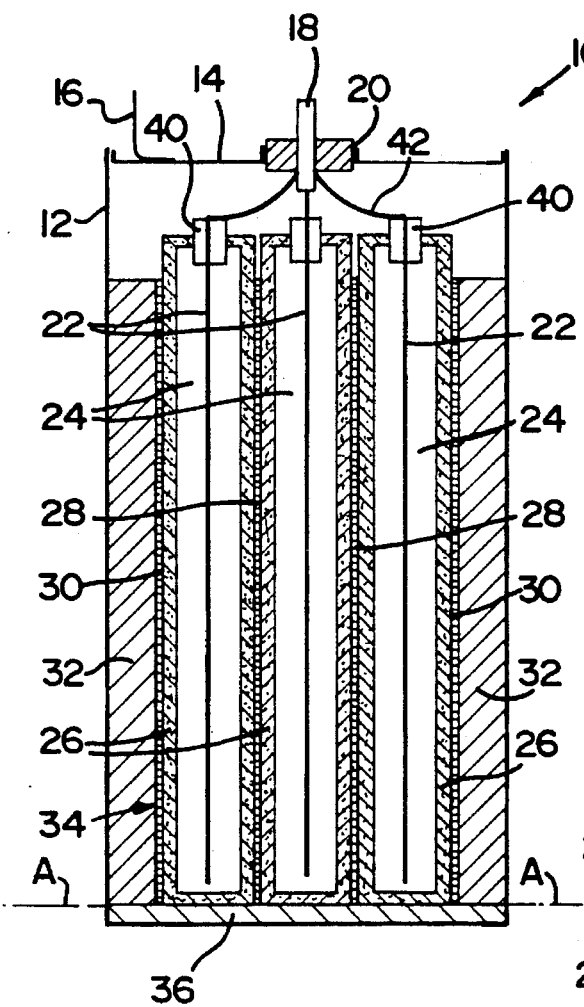
FIG. 1 shows a sectional side elevation of an electrochemical cell in accordance with a first embodiment of the invention.

Reference numeral 12 generally designates a metal cell case or can, being sealed by a metallic lid or cover 14 having a negative terminal 16, said cover also bearing a positive cell terminal 18 sealed into an insulating terminal feedthrough 20. The terminal 18 is connected to three positive current collectors 22, located in three cathodic electrode spaces 24 defined by three flat plate solid electrolyte envelopes 26. The spaces 24 also contain a positive active mass together with a molten electrolyte as hereinbefore described and which are not shown.

The large, opposing faces of the envelopes 26 are separated by two electrically conductive, adjacent wicking means 28, and the two outer large envelope faces which extend parallel to said inner, opposing faces are provided with two outer wicking means 30, pressed against said outer faces by deformable support structures 32 lodged between the cell case 12 and said outer wicking means 30.

Below line A—A, ie below a positive plate pack or stack 34 defined by the three envelopes 26, a porous metallic support structure 36, electrically connected to the wicking means 28 and 30 at right angles therewith, covers the cell bottom. The support structure 36 constitutes both an alkali metal reservoir for deep or overdischarge conditions and a support for said plate pack.

The upper ends of the envelopes 26 are closed by individual feedthroughs 40, with the current collectors 22 being connected to the positive cell terminal 18 by insulated tabs 42. The deformable support structures 32 are in the form of plastic wire coils which surround the three envelope plate pack 34 on all four sides and keep it in position under tension. The pack 34 is also supported by the support structure 36 which is in the form of a metallic foam.

Figure 2:
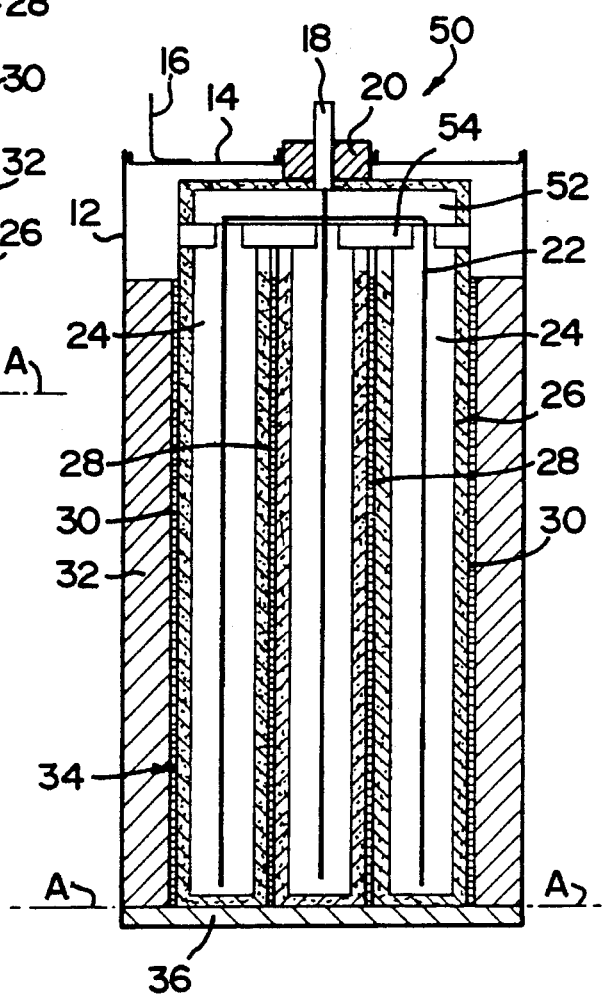
FIG. 2 shows a sectional side elevation of an electrochemical cell in accordance with a second embodiment of the invention.

Referring now to FIG. 2 of the drawings, reference numerals 50 generally indicates an electrochemical cell in accordance with a second embodiment of the invention.

In the cell 50, the cathodic spaces of the three envelopes 26 are in communication with one another via a gas space 52 above the liquid electrolyte level by means of a common header 54 of nonconducting material, which is sealingly connected to said envelopes and to the positive feedthrough 20.

The deformable support structure 32 in the non-wicking, lateral outer zones is in the form of coarse-pored metal wool, while the porous metallic support 36 is a corrugated metal sheet spot-welded to the metal cell casing bottom.

Figure 3:
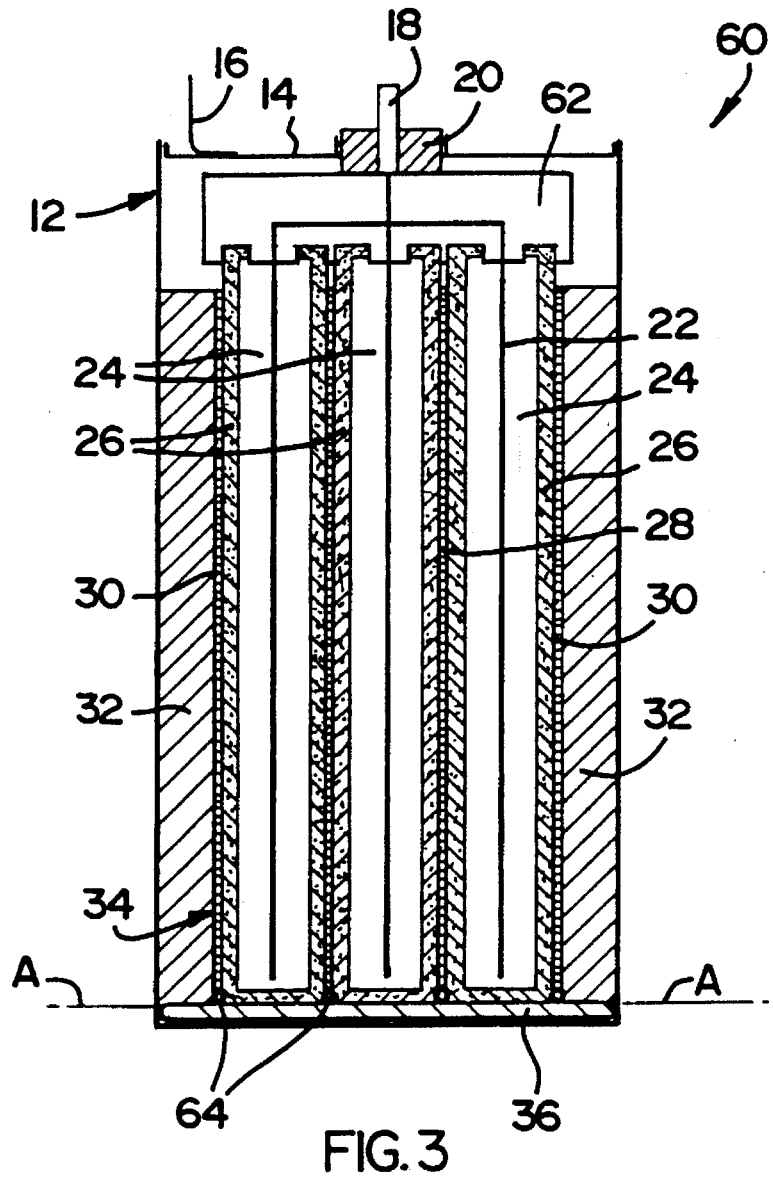
FIG. 3 shows a sectional side elevation of an electrochemical cell in accordance with a third embodiment of the invention.

In FIG. 3, reference numeral 60 generally indicates an electrochemical cell in accordance with a third embodiment of the invention.

The cell 60 has non-communicating cathodic spaces 24, with the envelopes 26 being sealed against each other and against the negative (anodic) space by a common headpiece 62 of insulating material enclosing the leads (tabs) from the individual positive current collectors 22 to the positive cell terminal 18. The headpiece 62 is manufactured from a curing or setting inorganic or organic cement, and is sealingly connected to the positive terminal feedthrough 20.

The lateral support structure 32 consists of porous, deformable material which is not elastic at the cell operating temperature but which will deform/compress significantly when its yield strength is surpassed, eg by the cell casing bulging inward, without breaking the envelopes. Moreover, the support structure is coated with a material which is poorly wettable by the liquid alkali metal contained in the anodic electrode space. The bottom support and current collector 36 is a double-bent, elastic metal sheet having ribs 64 extending parallel to the wicking means, said ribs interlocking at least partly with the wicking spaces, thus securing the bottom part of the envelopes.

Figure 4:
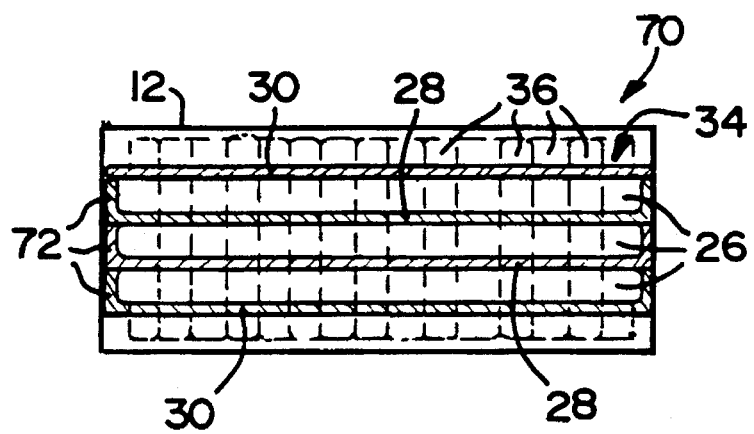
FIG. 4 shows a sectional plan elevation, as seen from the cell bottom, of an electrochemical cell in accordance with a fourth embodiment of the invention.

In FIG. 4, reference numeral 70 generally indicates an electrochemical cell in accordance with a fourth aspect of the invention.

FIG. 4 can be a plan elevation of any one of the cells of FIGS. 1 to 3, with the cell headspace particulars such as terminals and feedthroughs as well as positive current collectors, omitted.

In FIG. 4, the envelopes 26 extend so far in a plane perpendicular to the envelope stacking direction that the positive plate pack 34 is, in plan view, of rather elongated aspect, providing two narrow and two wide vertical outer faces of the parallelepiped circumscribing said plate pack, with only the wide faces being supported by the lateral support structure 32 (not shown) which is made of elastic corrugated metal sheet. The cell case is sufficiently close to the narrow faces of said parallelepiped to utilize said narrow faces as wicking zones. Accordingly, wicking means are interposed between the narrow or edge faces of said envelopes and the cell case, and thus all four vertical faces of said parallelepiped are furnished with wicking means. Instead of utilizing separate wicking layers for said narrow faces, the inner wicking means 28 and one of the outer wicking means 30 are extended to wrap around the edges of the adjacent envelopes, with these flaps or extensions 72 forming the outer wicking means in said narrow faces of the plate stack.

The bottom alkali metal reservoir and support 36 is provided by a corrugated, perforated metal sheet with corrugation grooves extending parallel to the stacking direction of the envelopes, as indicated by the broken lines in FIG. 4.

We claim:

1. An elevated temperature rechargeable electrochemical cell comprising a hollow prismatic cell casing having a cell bottom, a cover spaced from the bottom, and walls between the cell bottom and cover, the cell casing defining a negative electrode compartment for containing an alkali metal negative electrode; a plurality of flat plate solid electrolyte electrode holders or envelopes in the cell casing with each electrode holder or envelope comprising a pair of spaced plates providing major faces of the holder or envelope, the major faces extending parallel to an opposed pair of the walls of the cell casing, with each holder or envelope also providing a positive electrode compartment for containing a liquid electrolyte; a positive electrode in each of the positive electrode compartments, the positive electrodes being electrically connected in parallel and defining, together with their respective envelopes, a positive plate stack, such that in the fully charged state of the cell the major portion of the liquid alkali metal is contained in the negative electrode compartment outside the positive plate stack; and wicking means for the liquid alkali metal, adjacent at least the major faces of the holders or envelopes so that outer plate wicking means adjacent the outermost plates of the positive plate stack and interplate wicking means between adjacent plates of adjacent holders or envelopes in the positive plate stack are provided, and in which the level of the liquid alkali metal remains substantially constant.

2. An electrochemical cell according to claim 1, wherein the alkali metal is sodium so that the cell has a liquid sodium negative electrode at its operating temperature; the solid electrolyte is sodium conducting, and is selected from the beta-alumina structural family of compounds; and the liquid electrolyte is a liquid molten salt sodium ion conductive electrolyte in hydraulic and ionic contact with both the solid electrolyte and the positive electrode.

3. An electrochemical cell according to claim 1, which includes a positive current collector with which the positive electrode in each envelope is in contact, and a positive cell terminal with which all the positive current collectors are in contact, each positive current collector extending three-dimensionally throughout its envelope, and serving to hold and cage both the solid and liquid constituents of the positive electrode, including the liquid electrolyte.

4. An electrochemical cell according to claim 1, which includes a negative cell terminal, and a porous metallic structure at the bottom of the cell casing which supports the positive plate stack, the porous metallic structure functioning as an alkali metal sump or reservoir and as a negative current collector, and being in electrical contact with the negative cell terminal, with the outer plate and interplate wicking means being in electrical contact with the porous metallic structure for all states of charge of the cell.

5. An electrochemical cell according to claim 4, wherein the porous metallic structure supports the positive plate stack in an elastic manner, equalising any variations in plate height by spanning the lower plate edges—cell bottom distance.

6. An electrochemical cell according to claim 4, wherein the wicking means comprise felts, fibre packs, foams, corrugated or otherwise profiled sheets, smooth or unprofiled sheets, powders, or combinations thereof.

7. An electrochemical cell according to claim 6, wherein the wicking means are selected such that their electrical conductance complements that of the liquid alkali metal contained in the area contacted by the wicking means, and that of the porous metallic structure.

8. An electrochemical cell according to claim 6, wherein the wicking means are selected such that their electrical conductance is sufficiently high so that they are, in addition to being capable of alkali metal transport, also capable of sufficient electron transport to function also as current collectors.

9. An electrochemical cell according to claim 6, wherein at least one of the wicking means presses against the envelope plate against which it abuts, with that wicking means thus being sufficiently elastic and compliant to make hydraulic and electric contact with the plate.

10. An electrochemical cell according to claim 6, wherein at least one of the wicking means is in the form of a porous conductive layer fixed to the envelope plate against which it abuts.

11. An etectrochemical cell according to claim 10, wherein the porous conductive layer is located between a pair of envelopes, and cements together adjacent plates of the envelopes, thereby bridging the gap between the envelopes and creating a unitary plate block.

12. An electrochemical cell according to claim 6, which includes a support structure adjacent at least one of the wicking means and pressing said wicking means and the envelopes together.

13. An electrochemical cell according to claim 12, wherein the support structure is porous and deformable, and is interposed between the cell casing and the positive plate stack.

14. An electrochemical cell according to claim 13, wherein the support structure comprises a metal or non-metal fibre plate, a corrugated sheet with or without perforations, or an expanded metal type netting.

15. An electrochemical cell according to claim 1, wherein edges of the envelopes which extend parallel to the general direction of current flow are spaced from the cell casing, with additional outer wicking means being provided in the space between these edges and the casing.

16. An elevated temperature rechargeable electrochemical cell comprising a hollow prismatic cell casing having a cell bottom, a cover spaced from the bottom, and walls between the cell bottom and cover, the cell casing defining a negative electrode compartment for containing an alkali metal negative electrode; a plurality of flat plate solid electrolyte electrode holders or envelopes in the cell casing with each electrode holder or envelope comprising a pair of spaced plates providing major faces of the holder or envelope, the major faces extending parallel to an opposed pair of the walls of the cell casing, with each holder or envelope also providing a positive electrode compartment for containing a liquid electrolyte; a positive electrode in each of the positive electrode compartments, the positive electrodes being electrically connected in parallel and defining, together with their respective envelopes, a positive plate stack, such that in the fully charged state of the cell the major portion of the liquid alkali metal is contained in the negative electrode compartment outside the positive plate stack; wicking means for the liquid alkali metal, adjacent at least the major faces of the holders or envelopes so that outer plate wicking means adjacent the outermost plates of the positive plate stack and interplate wicking means between adjacent plates of adjacent holders or envelopes in the positive plate stack are provided, and in which the level of the liquid alkali metal remains substantially constant; and a support structure adjacent at least one of the wicking means and pressing said wicking means and the envelopes together.

17. An elevated temperature rechargeable electrochemical cell comprising a hollow prismatic cell casing having a cell bottom, a cover spaced from the bottom, and walls between the cell bottom and cover, the cell casing defining a negative electrode compartment for containing an alkali metal negative electrode; a plurality of flat plate solid electrolyte electrode holders or envelopes in the cell casing with each electrode holder or envelope comprising a pair of spaced plates providing major faces of the holder or envelope, the major faces extending parallel to an opposed pair of the walls of the cell casing, with each holder or envelope also providing a positive electrode compartment for containing a liquid electrolyte and with edges of the envelopes which extend parallel to the general direction of current flow being spaced from the cell casing; a positive electrode in each of the positive electrode compartments, the positive electrodes being electrically connected in parallel and defining, together with their respective envelopes, a positive plate stack, such that in the fully charged state of the cell the major portion of the liquid alkali metal is contained in the negative electrode compartment outside the positive plate stack; wicking means for the liquid alkali metal, adjacent at least the major faces of the holders or envelopes so that outer plate wicking means adjacent the outermost plates of the positive plate stack and interplate wicking means between adjacent plates of adjacent holders or envelopes in the positive plate stack are provided, and in which the level of the liquid alkali metal remains substantially constant; and additional outer wicking means in the space between the edges of the envelopes which extend parallel to the general direction of current flow, and the casing.

* * * * *

UNITED STATES PATENT AND TRADEMARK OFFICE
CERTIFICATE OF CORRECTION

PATENT NO. : 5,563,006
DATED : October 8, 1996
INVENTOR(S) : Klaus Von Benda and Gerhard Berger It is certified that error appears in the above-indentified patent and that said Letters Patent is hereby corrected as shown below:

On the face of the patent, please add the assignee as follows:

--[73] Assignee: PROGRAMME 3 PATENT HOLDINGS, Luxembourg.--

Signed and Sealed this

Second Day of September, 1997

Attest:

BRUCE LEHMAN

Attesting Officer

Commissioner of Patents and Trademarks